3,309,403
CARBONYLATION OF ALLYLIC HALIDES
Irving L. Mador, Cincinnati, Ohio, and John A. Scheben, Erlanger, Ky., assignors to National Distillers and Chemical Corporation, New York, N.Y., a corporation of Virginia
No Drawing. Filed Oct. 16, 1963, Ser. No. 316,550
17 Claims. (Cl. 260—544)

This invention relates to the preparation of acyl halides by the reaction of allylic halides with carbon monoxide in the presence of catalysts. More specifically, this invention relates to the preparation of vinylacetyl chloride in commercial yields from allyl chloride using platinum group catalysts, particularly palladium catalysts.

It is an object of this invention to prepare allylic acyl halides by the reaction of allylic halides with carbon monoxide by means of an efficient catalytic process. Another object is to provide a commercial process for the conversion of allyl chloride to vinylacetyl chloride using a platinum group catalyst. Other objects will appear hereinafter.

Vinylacetyl chloride is useful for the preparation of vinylacetic acid by hydrolysis. Vinylacetyl chloride is also a useful intermediate for the production of vinylacetamide by reaction with ammonia or for the production of N-substituted amides by reaction with amines. Vinylacetyl chloride as well as the other acyl halides which are prepared by this method are useful for the production of polymeric materials, either alone or by copolymerization with other substances such as styrene or acrylic compounds.

It is an advantage of this invention that the unsaturated acid halide, and particularly vinylacetyl chloride, is made directly as a one-step process.

It has been discovered that allyl halides will react with carbon monoxide in the presence of a platinum group catalyst to form the corresponding acyl halides. This reaction may be illustrated as follows:

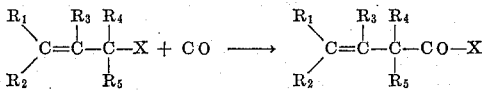

where X is chlorine or bromine and $R_1$ through $R_5$ are members of the group consisting of hydrogen, alkyl, aryl, cycloalkyl, and halogen. The carbon substituents may in turn contain groups such as halogen, nitro, or ester. Examples of such compounds include allyl chloride, allyl bromide, α-methallyl chloride, β-methallyl chloride, γ-methallyl chloride, 1-phenyl-3-chloropropene-1, 1-chloromethyl cyclohexene, ethyl 2-chlorobuten-3-oate, p-nitrocinnamyl bromide, and bis-allylic halides such as 1,4-dichloro-2-butene.

In a preferred embodiment of our invention palladium catalysts are employed. The palladium catalyst may be as a salt, e.g., chloride, nitrate, oxide, sulfate, or acetate; as a complex, e.g., benzonitrile, bis-π-allyl; as a chelate, e.g., acetylacetonate; or as the metal which may be supported on an inert carrier, e.g. carbon, alumina, or silica. Similarly, catalysts of other platinum group metals, i.e., ruthenium, rhodium, osmium, iridium, and platinum, in the form of the free metal or a compound, particularly as halide salts, also catalyze the above reaction.

In our process the catalyst may be utilized in the range of about 0.001 to 20 molar percent based on the amount of allyl halide employed. A preferred range is about 0.01 to 1.0 percent. Two or more metals may be employed in combination.

In another embodiment of our invention, a promoter is used in conjunction with the catalyst to increase the rate of conversion to the acyl halide. A suitable compound for this purpose is dimethylsulfoxide. From 1 to about 3 moles of promoter per mole of catalyst give satisfactory results.

The allyl halide is generally the solvent for the reaction. However, anhydrous solvents such as aliphatic or aromatic hydrocarbons, ethers, phosphines, or chlorinated aliphatic hydrocarbons may be used, e.g., mineral spirits, heptane, benzene, tetrahydrofuran, diethyl ether, dimethoxy ethane, triphenyl phosphine, carbon tetrachloride, etc.

The yield of the unsaturated acyl halide varies somewhat with temperature. The reaction may be carried out from about 20° C. to about 250° C. Below 20° C. the reaction rate is suppressed; at the higher temperatures polymeric by-products may be formed. The preferred range is from about 35° C. to 125° C.

Widely varying pressures from about 1 to 300 atmospheres may be utilized; however, the preferred pressure range is from about 35 to about 90 atmospheres.

The product is recovered by any suitable means. Conveniently the catalyst is filtered off, and the filtrate is fractionally distilled to separate the product from the unconverted starting material and any added solvent. In continuous operation, recovered catalyst and unreacted allyl halide can be recycled to the reactor, along with any added solvent, additional allyl halide and catalyst introduced, the reactor repressurized with carbon monoxide, and the reaction repeated.

The following examples are presented to illustrate the invention but are not intended to limit it thereto.

*Example I*

Palladous chloride, 3.55 grams (20 millimoles), and 86.4 grams (1.13 moles) of freshly distilled allyl chloride were placed in a glass liner of a rocking autoclave. After sealing, the bomb was purged with nitrogen, and then carbon monoxide was added to a pressure of 90 atmospheres. The bomb contents were rocked and heated at 60° C. for 32 hours. At the end of this period the excess pressure was vented and the system opened. The reaction mixture was filtered under a nitrogen atmosphere to give a yellow precipitate containing 59.9% Pd; theory for $PdCl_2$, 60.1%. Distillation of the filtrate gave vinylacetyl chloride, B.P. 95–96° C. Analysis of the distillate indicated a 74% conversion of allyl chloride to vinylacetyl chloride with an 80% yield of vinylacetyl chloride based on the amount of reacted allyl chloride.

A portion of the filtrate was converted to the anilide derivative. After recrystallization from a mixture of alcohol and water, the solid melted at 65° C. Analysis of the anilide $C_{10}H_{11}ON$:

Calculated: C, 74.51; H, 6.88. Found: C, 73.89; H, 6.70.

Hydrogenation of this anilide derivative produced the anilide of n-butyryl chloride: M.P. found 95–96° C.; literature value, 96° C.

In accordance with the above procedure, but carrying out the reaction at 70° C. for 17 hours, there resulted a 50% conversion of allyl chloride to vinylacetyl chloride, with an 84% yield of vinylacetyl chloride based on the amount of reacted allyl chloride.

*Example II*

Palladous chloride (10 millimoles) and allyl bromide (0.37 mole) were heated at 70° C. for 30 hours in an autoclave as in Example I under an initial carbon monoxide pressure of 86 atmospheres. An 8% conversion of allyl bromide to vinylacetyl bromide, boiling at 62–64° C./60 mm., was obtained. A portion of the vinylacetyl bromide was converted to the anilide, M.P. 65° C.

Example III

Palladous chloride (8.8 millimoles) and β-methallyl chloride were heated at 70° C. for 49 hours in an autoclave as in Example I under an initial carbon monoxide pressure of 73 atmospheres. After filtration there was obtained on distillation a liquid, B.P. 40–42° C. at 42 mm. The nuclear magnetic resonance was consistent with the structure of 3-methyl-vinylacetyl chloride. The anilide derivative had an M.P. of 75–76° C.

Example IV

Palladous chloride (11.8 millimoles) and γ-methallyl chloride (1-chlorobutene-2) (0.53 mole) were heated at 70° C. for 48 hours in an autoclave as in Example I under an initial carbon monoxide pressure of 48 atmospheres. On distillation, after filtration, 3-pentenoyl chloride was obtained in 30% conversion. The structure was confirmed by nuclear magnetic resonance analysis. The anilide derivative had an M.P. of 63–64° C. Hydrogenation of the anilide derivative gave a solid having an M.P. of 62–63° C. The literature value for the anilide derivative of n-valeric acid is 63° C.

Example V

A homogeneous solution of 6.7 millimoles of bis(benzonitrile) palladous chloride complex and 0.94 mole of allyl chloride was heated at 70° C. for 24 hours as in Example I under an initial carbon monoxide pressure of 54 atmospheres. A 24% conversion of allyl chloride to vinylacetyl chloride, identified by gas chromatographic analysis, took place.

Example VI

A pressure reactor was charged with 2.7 millimoles of palladium acetylacetonate and 1.05 moles of allyl chloride. The reactor was flushed with nitrogen and pressured to 93.5 atmospheres with carbon monoxide. The reactor was heated at 71° C. for 22 hours. Analysis of the product showed a 31% conversion of allyl chloride to vinylacetyl chloride.

Example VII

In a glass liner of a stirred autoclave 1.97 millimoles of a 5% palladium on carbon catalyst was suspended in 0.6 mole of allyl chloride. The apparatus was sealed, purged with nitrogen, and pressured to 81 atmospheres of carbon monoxide. The mixture was stirred for 72 hours at 70° C. Analysis of the product showed a 21% conversion of allyl chloride to vinylacetyl chloride.

Example VIII

A suspension of 6 millimoles of bis(π-allylpalladium chloride) complex in 0.68 mole of allyl chloride was heated at 71° C. for 22.5 hours in a stirred autoclave under 63 atmospheres of carbon monoxide pressure. The excess gas was then vented and the reaction mixture filtered. There was recovered one gram of a light brown solid which had a palladium content of 57.1%; theory for $C_3H_5ClPd$ is 58.2% Pd. The filtrate contained 24% of vinylacetyl chloride. The conversion of allyl chloride to vinylacetyl chloride amounted to 21%.

Example IX

A pressure reactor was charged with 20 millimoles of palladous chloride, 0.87 mole of allyl chloride, and 75 ml. of odorless mineral spirits (B.P. 177–196° C.). After flushing the reactor with nitrogen, the carbon monoxide pressure was adjusted to 84 atmospheres, and the reactants were rocked for 96.5 hours at 70° C. A 69% conversion of allyl chloride to vinylacetyl chloride resulted. The product was identified by gas chromatographic analysis.

Example X

A glass liner of a stirred autoclave was charged with 1.5 grams (8.4 millimoles) of palladous chloride, 2.62 grams (10 millimoles) of triphenylphosphine, and 75.7 grams (0.996 mole) of allyl chloride. After flushing the reactor with nitrogen, the system was pressured to 56 atmospheres with carbon monoxide and then heated at 71° C. for 49 hours. At the end of this period the excess pressure was vented, and the reaction mixture was filtered. The precipitate contained 23.0% palladium. Vinylacetyl chloride was identified in the filtrate by gas chromatographic analysis.

Example XI

A pressure reactor was charged with 1.0 gram (4.3 millimoles) of palladium nitrate and 74.0 grams (0.97 mole) of allyl chloride. The reactor was purged with nitrogen and then saturated with carbon monoxide to a pressure of 90 atmospheres. The reactants were stirred for 22 hours at 71° C. Analysis showed a 27% conversion of allyl chloride to vinylacetyl chloride.

Example XII

A pressure reactor was charged with 8.56 millimoles of palladous chloride and 1.0 mole of allyl chloride. The reactor was flushed with nitrogen and pressured to 68 atmospheres with carbon monoxide. Using a reaction temperature of 95° C., samples of the reaction mixture were taken after various periods of reaction, and the percent conversion to vinylacetyl chloride determined for each sample. Results are tabulated below.

| Reaction time, hours | Conversion, percent |
|---|---|
| 0.5 | 30 |
| 1 | 40 |
| 2 | 60 |
| 4 | 74 |
| 6 | 74 |

Example XIII

A pressure reactor was charged with 8.7 millimoles of recovered catalyst from a previous synthesis. To this was added 1.0 mole of allyl chloride. The system was saturated with carbon monoxide at 22 atmospheres, and after reaching 95° C. the carbon monoxide pressure was raised to 81 atmospheres for 6.5 hours. Analysis of the produce revealed a 78% conversion with a 77% yield of an acyl halide.

Example XIV

A pressure reactor was charged with 8.45 millimoles of palladium chloride, 17.1 millimoles of dimethylsulfoxide, and 1.0 mole of allyl chloride. The reactor contents were heated at 75° C. for 6.5 hours under 63 atmospheres of carbon monoxide pressure. Analysis of the product showed a 49.5% conversion of allyl chloride to vinylacetyl chloride. In a similar experiment but without the dimethylsulfoxide the conversion amounted to 37.5%.

Example XV

A pressure reactor was charged with 6.3 millimoles of rhodium trichloride and 0.75 mole of allyl chloride. The reactor was purged with nitrogen and then saturated with carbon monoxide to a pressure of 61 atmospheres. The reactants were stirred for 22 hours at 71° C. Analysis showed a 5% conversion of allyl chloride to vinylacetyl chloride.

Example XVI

A pressure reactor was charged with 10.5 millimoles of platinum dichloride and 0.99 mole of allyl chloride. The reactor was purged with nitrogen and then saturated with carbon monoxide to a pressure of 67 atmospheres. The reactants were stirred for 48 hours at 71° C. Analysis showed a 2.5% conversion to vinylacetyl chloride.

As will be evident to those skilled in the art, various modifications of this invention may be made or followed in the light of the foregoing disclosure and discussion without departing from the spirit or scope thereof.

What is claimed is:
1. A process which comprises the reaction of carbon monoxide with an allyl halide having the formula

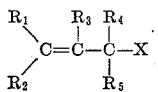

wherein
X is selected from the group consisting of chlorine and bromine, and
$R_1$, $R_2$, $R_3$, $R_4$, and $R_5$ are independently selected from the group consisting of hydrogen, halogen, alkyl, aryl, and cycloalkyl, in the presence of a platinum group catalyst at an elevated temperature and pressure, to produce the corresponding acyl halide having the formula

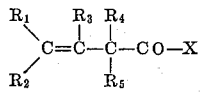

wherein $R_1$, $R_2$, $R_3$, $R_4$, $R_5$, and X have the meaning above defined.

2. The process of claim 1 wherein said platinum group catalyst is a palladium catalyst.
3. The process of claim 2 wherein the palladium catalyst is selected from the group consisting of palladium, a palladium salt, and a palladium complex with an organic compound.
4. The process of claim 3 wherein the palladium catalyst is palladous chloride.
5. The process of claim 1 wherein the allyl halide is allyl chloride.
6. The process of claim 1 wherein the allyl halide is a methallyl halide.
7. The process of claim 1 wherein said temperature is within the range of about 20° to 250° C.
8. The process of claim 1 wherein said pressure is within the range of about 1 to 300 atmospheres.
9. The process of claim 1 wherein a hydrocarbon solvent is added.
10. A process for the preparation of vinylacetyl chloride which comprises treating allyl chloride with carbon monoxide in the presence of a platinum group catalyst at a temperature within the range of about 35° to 125° C. and at a pressure within the range of about 35 to 90 atmospheres.
11. The process of claim 10 wherein said platinum group catalyst is selected from the group consisting of palladium, a palladium salt, and a palladium complex with an organic compound.
12. The process of claim 11 wherein the palladium is supported on an inert carrier.
13. The process of claim 11 wherein the platinum group catalyst is a palladium salt.
14. The process of claim 13 wherein the palladium salt is palladous chloride.
15. The process of claim 11 wherein said platinum group catalyst is a palladium complex with an organic compound.
16. The process of claim 10 wherein the platinum group catalyst is rhodium trichloride.
17. The process of claim 10 wherein the platinum group catalyst is platinum dichloride.

References Cited by the Examiner
UNITED STATES PATENTS

| | | | |
|---|---|---|---|
| 2,876,254 | 3/1959 | Jenner et al. | 260—468 X |
| 2,894,038 | 7/1959 | Bartlett et al. | 260—514 X |
| 3,221,045 | 11/1965 | McKeon et al. | 260—468 X |

OTHER REFERENCES

Fischer et al.: Zeitschrift für Naturforschung, vol. 17B (1962), pp. 484–485.

Chiusoli et al.: Zeitschrift für Naturforschung, vol. 17B (1962), p. 850.

Heck: J. Am. Chem. Soc., vol. 85 (1963), pp. 2013–2014.

Huttel et al.: Deut. Chem. Ber., vol. 94, pp. 766–780 (1961).

Dehm et al.: J. Am. Chem. Soc., vol. 82 (1960), pp. 4429–4430.

LORRAINE A. WEINBERGER, *Primary Examiner.*

RICHARD K. JACKSON, *Examiner.*